United States Patent
Holt et al.

(10) Patent No.: US 8,235,186 B2
(45) Date of Patent: Aug. 7, 2012

(54) HYDRAULIC DAMPER SPOOL VALVE

(75) Inventors: Laurence James Holt, Uxbridge (CA); Peter David Twissell, Old Buckenham (GB); Michael John Robert Gricks, Great Yarmouth (GB); Jeffrey Alan Laidman, Grassie (CA)

(73) Assignee: Multimatic Inc., Markham (CA)

( * ) Notice: Subject to any disclaimer, the term of this patent is extended or adjusted under 35 U.S.C. 154(b) by 379 days.

(21) Appl. No.: 12/575,464

(22) Filed: Oct. 7, 2009

(65) Prior Publication Data
US 2011/0079476 A1 Apr. 7, 2011

(51) Int. Cl.
*F16F 9/346* (2006.01)
*F16F 9/34* (2006.01)

(52) U.S. Cl. ............... 188/282.8; 188/313; 188/317; 188/322.15

(58) Field of Classification Search .......... 188/281, 188/282.1, 282.8, 286, 313, 316, 317, 322.13, 188/322.15, 322.22
See application file for complete search history.

(56) References Cited

U.S. PATENT DOCUMENTS

| | | | |
|---|---|---|---|
| 1,995,910 A * | 3/1935 | Wyeth | 188/313 |
| 2,458,157 A * | 1/1949 | Funkhouser | 188/322.15 |
| 2,748,898 A | 6/1956 | De Carbon | |
| 2,821,268 A | 1/1958 | De Carbon | |
| 3,584,712 A | 6/1971 | Dickinson | |
| 3,696,894 A | 10/1972 | Brady et al. | |
| 3,747,714 A | 7/1973 | De Carbon | |
| 3,807,668 A | 4/1974 | Whitener et al. | |
| 3,827,539 A | 8/1974 | Fader et al. | |
| 3,888,436 A | 6/1975 | Sealey | |
| 3,958,672 A | 5/1976 | Keilholz | |
| 3,993,294 A | 11/1976 | Wossner et al. | |
| 4,111,231 A | 9/1978 | Leppich | |
| 4,638,896 A | 1/1987 | Poyser | |
| 4,926,983 A | 5/1990 | Taubritz et al. | |
| 5,271,485 A | 12/1993 | Yowell et al. | |
| 5,303,804 A * | 4/1994 | Spiess | 188/322.15 |
| 5,372,223 A | 12/1994 | De Kock | |
| 5,400,877 A | 3/1995 | Kirchner et al. | |
| 5,423,402 A | 6/1995 | de Kock | |
| 5,467,852 A | 11/1995 | de Kock | |
| 5,547,050 A | 8/1996 | Beck et al. | |
| 5,588,510 A | 12/1996 | Wilke | |
| 5,709,290 A | 1/1998 | Ekert et al. | |
| 5,769,192 A | 6/1998 | Beck | |
| 5,868,161 A | 2/1999 | Asbrand et al. | |
| 5,996,745 A | 12/1999 | Jones, Jr. et al. | |
| 6,135,434 A | 10/2000 | Marking | |
| 6,264,015 B1 | 7/2001 | de Kock | |

(Continued)

*Primary Examiner* — Thomas J Williams
(74) *Attorney, Agent, or Firm* — Gigette M. Bejin

(57) ABSTRACT

A hydraulic valve includes a main body, a valve body, a piston, a valve sleeve, a spool and a resilient energy storage member. The valve body and the piston are disposed within the main body. The valve body defines a first chamber, a second chamber, and a cylindrical passage connecting the first chamber and the second chamber. The valve sleeve is moveably disposed in the cylindrical passage. The spool is moveably disposed within the bore of the valve sleeve. The resilient energy storage member may be disposed between the valve sleeve and valve spool. The resilient energy storage member is compressed as pressure is induced in one of the first chamber or the second chamber such that the valve sleeve and the spool move relative to one another so that at least a portion of the shaped aperture is exposed to the first chamber or second chamber to allow a proportional amount of hydraulic fluid to flow between the first chamber and the second chamber.

15 Claims, 5 Drawing Sheets

U.S. PATENT DOCUMENTS

| | | |
|---|---|---|
| 6,311,812 B1 | 11/2001 | Sonerstaad et al. |
| 7,191,877 B2 | 3/2007 | Norgaard |
| 7,325,660 B2 | 2/2008 | Norgaard et al. |
| 2005/0133323 A1* | 6/2005 | Chen ........................ 188/322.13 |
| 2009/0020382 A1 | 1/2009 | Van Weelden et al. |

* cited by examiner

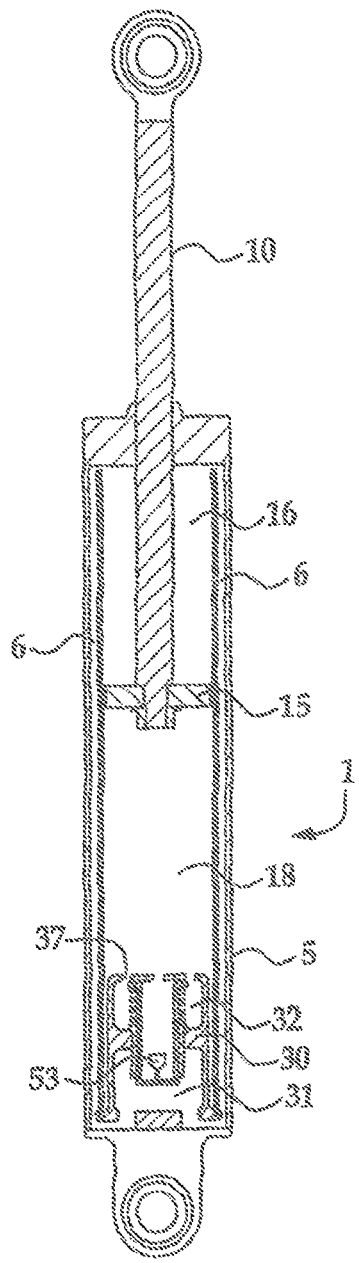
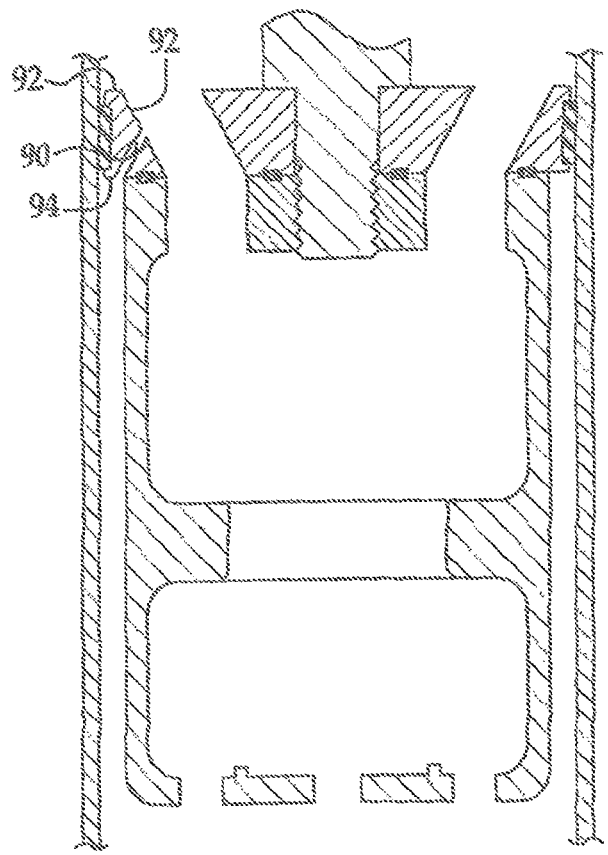
FIG. 7
FIG. 8

HYDRAULIC DAMPER SPOOL VALVE

BACKGROUND

The present disclosure relates to a valve for a hydraulic damper including a hydraulic damper for use in wheeled vehicle suspension.

Hydraulic dampers which are used to control dynamic systems generally utilize a piston adapted to be slideably carried within a cylindrical main body and peripherally sealed to its walls. The hydraulic damper is configured to be attached to a shaft assembly. The piston divides the cylindrical main body into two hydraulic chambers that are connected by restrictive passages which retard the rate of fluid flow between the two hydraulic chambers when the shaft assembly moves relative to the main body. In this manner the damper's core operating characteristic, defined by the relationship between pressure and flow, is dictated by the geometric configuration of restrictive passages between the two hydraulic chambers If the restrictive passages are simply configured as fixed orifices then the pressure generated across the damper piston increases as the square of the hydraulic flow through the orifices. Unfortunately this squared law pressure-flow relationship is not a desirable characteristic for controlling the majority of dynamic systems. In the case of an automotive suspension system the damper is normally referred to as a shock absorber and the pressure-flow characteristic is directly proportional to the shock absorber's defining force-velocity relationship which is generally required to be linear or even somewhat digressive. The method of achieving damper characteristics that differ from the basic fixed orifice square law is to vary the area of the orifice in a predetermined relationship to the pressure across the piston.

The most common variable orifice damper valve arrangement consists of a stack of compliant plates fixed in place over an array of passages that connect the two hydraulic chambers either through or around the piston. The pressure across the piston imparts a load on the plates causing them to deflect which in turn uncovers the passages and creates a path for the damper's hydraulic fluid. The magnitude of the deflection of the plates varies in proportion to the pressure across the piston and so creates a form of variable orifice. U.S. Pat. No. 2,748,898 to DeCarbon is the earliest reference to such an arrangement and describes a double acting shock absorber in which the piston is configured with an arrangement of passages that are sealed by resilient leaf elements that are stressed and resiliently bent by fluid issuing under pressure from the passages. The '898 patent also details a unique, but now widely utilized, method of arranging the passages and two sets of leaf elements, above and below the piston, so as to facilitate independent and possibly asymmetric pressure-flow characteristics in the two different operating directions.

The most significant limitation of using compliant plates to create a variable orifice damper valve is that the pressure-flow characteristic is highly dependent on the deformed shape of the compliant plates which in turn is extremely sensitive to plate thickness, plate material properties, dimensional tolerance of the plate shape, assembly process, friction between the plates in a stack, preload on the plates in a stack, locational tolerance of the passages relative to the plates, dimensional tolerance of the passage cross sections and cleanliness of the assembly. These sensitivities ultimately present a significant challenge to achieving a desired pressure-flow characteristic or when trying to match the characteristic of two dampers. An additional disadvantage of the compliant plate arrangement is that the pressure-flow characteristic cannot be easily predicted using mathematical techniques due to its complex operating mechanism. Another shortcoming of this configuration is that the pressure-flow characteristic tends to diverge from its original curve over time due to the compliant plate material becoming fatigued and losing its stiffness and strength as well as small particles, created from seal, piston and shaft wear, become trapped between the plates.

U.S. Pat. No. 5,547,050 issued to Beck illustrates the complexity associated with manufacturing and assembling a damper that utilizes compliant plates as a variable orifice. The '050 patent describes a method of attaching the plates and piston to a shaft to overcome some of the dimensional limitations associated with the arrangement. However, although the assembly approach outlined by the '050 patent eliminates the tolerances related to the compliant plate attachment it does not improve the variation associated with the dimensional accuracy of the plates themselves or the divergence from the original pressure-flow characteristic that occurs over time. Moreover, the '050 patent does not describe an arrangement for which the characteristic can be mathematically predicted.

U.S. Pat. No. 5,709,290 issued to Ekert et. al. describes a method of providing compression and rebound stop surfaces which uniformly support the compliant plates in their deflected state at both limits of deflection travel. The compliant plates of the '290 patent are prevented from yielding to a deformed condition which can significantly alter the designed-in performance characteristics of the damper assembly. This stop surface arrangement considerably improves the damper's ability to maintain its original pressure-flow characteristic over time. However, this system is particularly sensitive to detailed tolerances such that minor variations in specific design features may result in significant, undesirable changes in performance characteristics.

The limitations of variable orifice damper valves that utilize compliant plate stacks has been recognized but although numerous alternatives have been suggested, and appear in the prior art, this arrangement remains the absolute dominant approach to providing the desired pressure-flow characteristics in shock absorbers as used in automotive suspension systems.

U.S. Pat. No. 6,311,812 to Sönsteröd et al offers an alternative to the compliant plate approach by describing a poppet style pressure regulator that utilizes pressure balancing across the poppet to control the area of the resulting annular orifice. The shape of the front side of the poppet can be varied to control the pressure balancing. In this manner the overall pressure-flow characteristic of the pressure regulator and ultimately a damper that utilizes the device is controlled by the varying area of the annular orifice. Although the '812 patent overcomes many of the tolerance sensitivity problems associated with compliant plate variable orifice damper valves its basic configuration is limited by only offering an annular orifice hydraulic restriction. This limitation is overcome in alternative embodiments of the present disclosure but only through the addition of significant complexity which once again introduces additional sensitivity to manufacturing tolerance. However, the most significant limitation of the valve arrangement of the '812 patent is that the valve arrangement is uni-directional. For the pressure regulator of the '812 patent to be utilized in a double acting shock absorber, an array of one way ball valves are implemented to act in both compression and rebound directions. This limits the pressure-flow characteristic of the damper to be identical in the compression and rebound directions which is rarely desirable. Additionally the pressure regulator of the '812 patent is large and complex and cannot be contemplated to be integrated into a damper piston. Finally, similar to the compliant plate configurations, the '812 patent does not describe an arrangement for which the pressure-flow characteristic can be mathematically predicted.

An effective but complex solution to the tolerance sensitivity problems that exist in passive variable orifice valves is described in U.S. Pat. No. 5,996,745, issued to Jones et al. The '745 patent claims a damper valve for controlling the pressure-flow and therefore force-velocity characteristic of a shock absorber that consists of a bender with a piezoelectric material embedded within it. The bender is used in a similar manner to the compliant plates of a conventional damper valve but by supplying a voltage across the piezoelectric material the stiffness of the bender is changed and the pressure required to deform the bender is modified. An electronic sensor is utilized to measure the velocity of the piston and the voltage supplied to bender is varied in relationship to the measured velocity. In this manner the stiffness of the bender is made dependent on the velocity of the damper and the force-velocity and therefore pressure-flow characteristics actively controlled using a feedback system. Although the piezoelectric material based variable orifice valve of Jones can overcome the tolerance limitations of passive damper valves the associated complexity and cost is prohibitive. Additionally, the '745 patent does not describe an arrangement for which the pressure-flow characteristic can be simply mathematically predicted.

Accordingly, it is desirable to provide a damper valve that eliminates the complexity associated with the existing styles of variable orifice arrangements yet offers a simple configuration that provides a mathematically predictable, repeatable and robust pressure-flow characteristic.

SUMMARY

An object of the present disclosure is to therefore provide a valve for a hydraulic damper that reduces the number of required components, simplifies the assembly procedure, lowers the manufacturing cost and improves the overall performance of the damper. Accordingly, the valve is configured to control the flow of hydraulic fluid across the main piston of the damper in a predetermined relationship to the pressure differential across the main piston via a variable orifice arrangement based on a proportionally blocked shaped aperture. The shaped aperture is configured to provide a single path for the hydraulic fluid between the two sides of the main piston and is adapted to be progressively opened and closed in response to the pressure differential across the main piston. In this manner the damper's operating characteristic is simply and predictably dictated by the geometric configuration of the shaped aperture. The precisely defined open area of the shaped aperture provides a mathematically predictable hydraulic flow restriction that operates predominately in a turbulent regime resulting in insensitivity to hydraulic fluid viscosity and consequently temperature change.

Therefore, the damper valve of the present disclosure comprises a valve body configured with two closed hydraulic chambers one of which is connected directly to the upper side of a damper piston and the second of which is connected directly to the lower side of the damper piston. The damper piston is configured to be connected to a shaft assembly and is adapted to be slideably carried within a cylindrical main body and peripherally sealed. The two closed hydraulic chambers contained within the valve body are interconnected via a cylindrical passage adapted to accept the external cylindrical surface of a hollow valve sleeve. The hollow valve sleeve is in turn adapted to accept a cylindrical valve spool that is configured with a shaped aperture located in the valve spool's cylindrical wall so that all of the hydraulic flow induced by movement of the shaft assembly and damper piston is directed to pass through the shaped aperture. The hollow valve sleeve is configured so as to completely block the shaped aperture when the shaft assembly and damper piston are stationary. Movement of the shaft assembly and damper piston induces operating pressures in the closed hydraulic chambers of the valve body that cause the valve spool and hollow valve sleeve to move relative to each other progressively opening the shaped aperture providing a hydraulic flow path between the two closed hydraulic chambers and therefore the upper and lower sides of the damper piston. The precisely defined open area of the shaped aperture provides a mathematically predictable hydraulic flow restriction that varies directly in response to the operating pressures of the damper. In this manner a highly predictable and precise pressure-flow relationship is achieved using only two moving components which significantly reduces the complexity of the damper valve and produces an accurate and repeatable operating performance.

In an embodiment of the present disclosure, the hollow valve sleeve is configured with a sharp edged land feature which accurately defines the extent of the shaped aperture blockage. When the shaft assembly and damper piston travel in a rebound direction the hollow valve sleeve is configured to move relative to the stationary valve spool and the moving sharp edged land feature progressively opens the stationary shaped aperture. When the shaft assembly and damper piston travel in a compression direction the valve spool is configured to move relative to the stationary hollow valve sleeve and the stationary sharp edged land feature progressively opens the moving shaped aperture.

In an embodiment of the present disclosure the internal bore of the hollow valve sleeve and the external cylindrical wall of the valve spool are configured with a close tolerance radial clearance that allows relative longitudinal movement while preventing hydraulic flow through the radial clearance. The external cylindrical surface of the hollow valve sleeve and the cylindrical passage of the valve body are also configured with a close tolerance radial clearance that allows longitudinal movement of the valve sleeve while preventing hydraulic flow through the radial clearance. A coil spring or similar resilient energy storage member is arranged between the valve sleeve and the valve spool so as to bias them in opposing directions. The valve sleeve and the valve spool are configured with stop faces that limit their relative longitudinal movement to a stationary limit by abutting with stop surfaces on the valve body. When the valve sleeve and the valve spool are at their stationary limits the shaped aperture is completely blocked by the valve sleeve and so there is no hydraulic path between the two closed hydraulic chambers and therefore no connection between the upper and lower sides of the damper piston.

When the shaft assembly and damper piston are moved in a rebound direction, a positive pressure may be induced on the upper side of the damper piston which is transferred to the first chamber of the valve body causing the pressure to act directly on a first effective piston area defined by the exposed annular surface of the valve sleeve. The operating pressure acting upon the first effective piston area induces longitudinal movement of the valve sleeve against the biasing force of the coil spring. In this operating state, the valve spool is held at its stationary limit by its stop face abutting a stop surface on the valve body and so the valve sleeve moves relative to the stationary valve spool and the moving sharp edged land feature progressively opens the stationary shaped aperture.

Additionally, in an embodiment of the present disclosure, when the shaft assembly and damper piston are moved in a compression direction a positive pressure is induced on the lower side of the damper piston which is transferred to the second chamber of the valve body causing the pressure to act directly on a second effective piston area defined by a closed end of the valve spool. The operating pressure acting upon the second effective piston area induces longitudinal movement of the valve spool against the biasing force of the coil spring. In this operating state, the valve sleeve is held at its stationary limit by its stop face abutting a stop surface on the valve body and so the valve spool moves relative to the stationary valve sleeve and the stationary sharp edged land feature progressively opens the moving shaped aperture.

Therefore, the present disclosure provides a highly predictable and precise bi-directional pressure-flow relationship is achieved using only two moving components which significantly reduces the complexity of the damper valve and produces an accurate and repeatable operating performance in both compression and rebound directions. An asymmetric operating characteristic can be achieved by configuring the first effective piston area and second effective piston area to be different so that the pressure-flow relationship in compression and rebound are different despite the hydraulic flow being limited to pass through the same shaped aperture in both operating directions.

The pressure vs. flow relationship of the hydraulic damper can be tuned by altering the rate of the coil spring, changing the pre-load on the coil spring, increasing or reducing the first or second effective piston areas or by altering the profile of the shaped aperture.

In an alternative embodiment of the present disclosure, two coil springs or similar resilient energy storage means are configured to individually bias the hollow valve sleeve and valve spool respectively. The valve body is configured with a spring seat that is adapted to carry a fixed end of the coil spring so that an even higher level of asymmetry can be achieved in the operating characteristic.

In a further alternative embodiment of the present disclosure, the valve body is mounted within the cylindrical main body of the hydraulic damper and provided with hydraulic passages so that movement of the shaft assembly and damper piston directs all induced hydraulic flow through the shaped aperture. In this way the valve body is stationary but the shaped aperture is configured to provide a single path for the hydraulic fluid between the two sides of the main piston and is adapted to be progressively opened and closed in response to the pressure differential across the main piston.

Further aspects of the disclosure will become apparent from the following description.

BRIEF DESCRIPTION OF THE DRAWINGS

FIG. 7 is a cross-sectional view of yet another embodiment of the hydraulic damper spool valve of the present disclosure.

FIG. 8 is a cross-sectional view of yet another embodiment of the hydraulic damper spool of the present disclosure where the bypass is shown.

DETAILED DESCRIPTION

Figure 1:
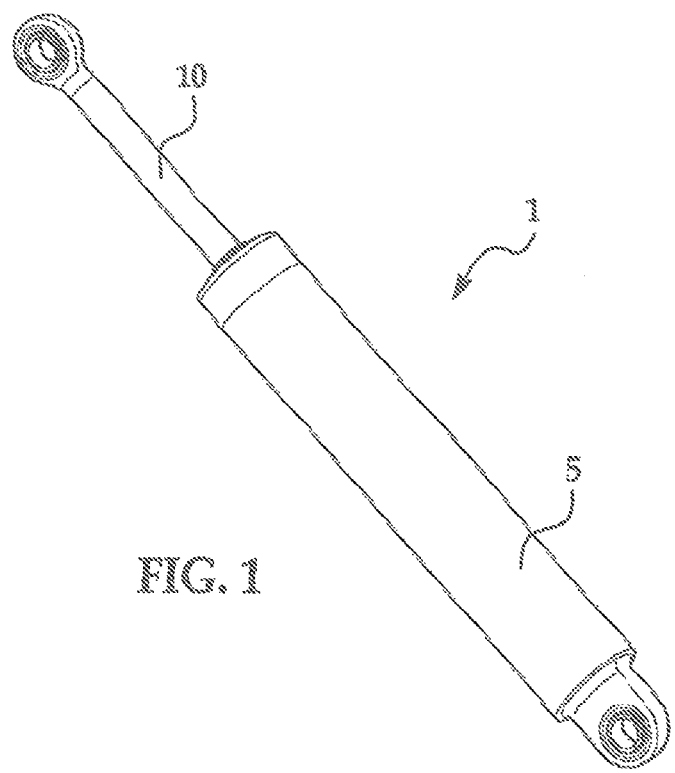
FIG. 1 is a perspective view of an embodiment of the hydraulic damper spool valve of the present disclosure.
Figure 2:
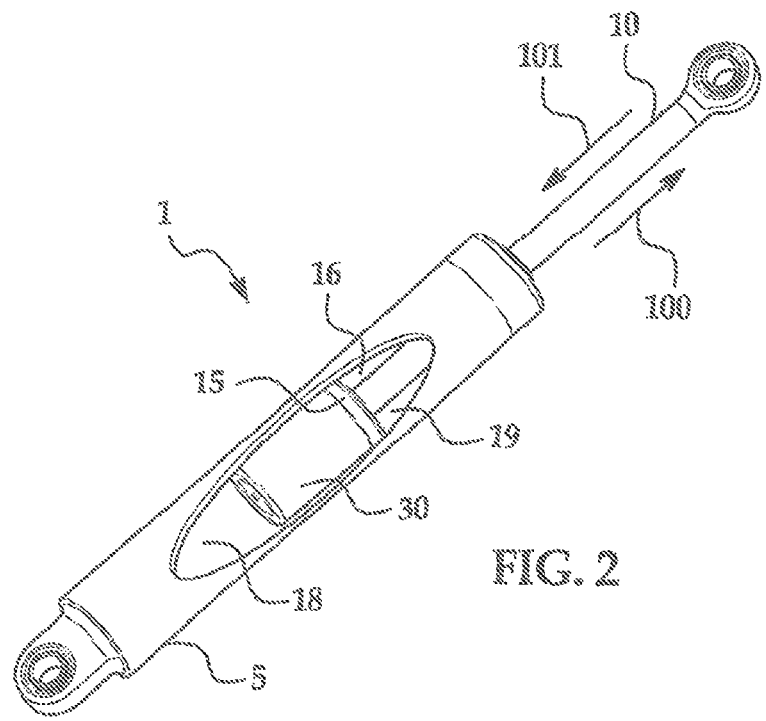
FIG. 2 is a partial cutaway perspective view of the hydraulic damper spool valve of the present disclosure.
Figure 4:
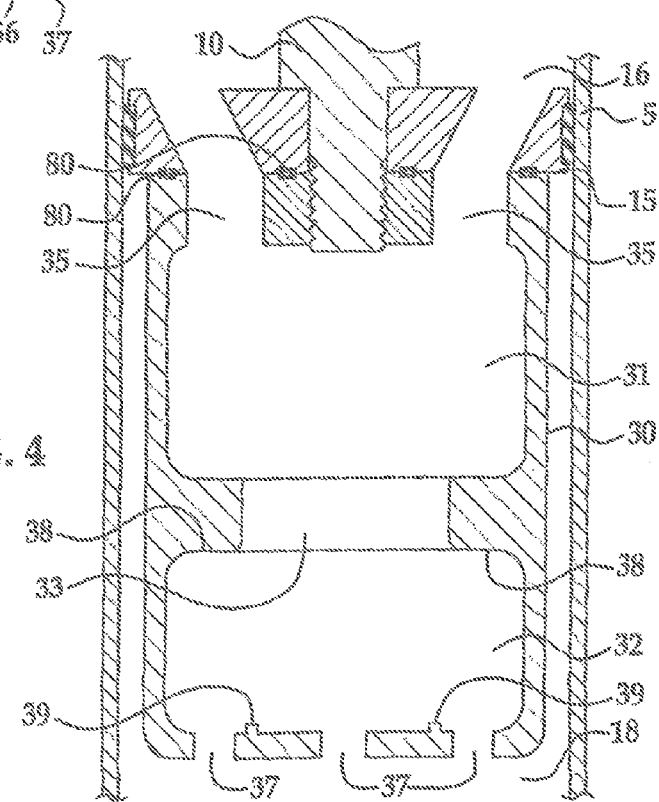
FIG. 4 is a selected sectional view of the valve body and main piston of the hydraulic damper spool valve of the present disclosure.

Referring to FIGS. 1, 2 and 4, a hydraulic damper assembly (1) consists of a main body (5), a shaft assembly (10) and a main piston (15) that is configured to divide the internal chamber of the main body (5) into an upper portion (16) and a lower portion (18). The hydraulic damper's upper portion (16) and lower portion (18) contain hydraulic fluid (19). In an embodiment of the present disclosure, a valve body (30) is mounted to the hydraulic damper main piston (15). The valve body (30) may be affixed to the main piston (15) through a mechanical fastener or the like. As shown in the non-limiting example in FIGS. 1, 2, and 4, one or more seals (80) may be disposed between the valve body (30) and the main piston (15). Furthermore, the shaft assembly (10) may be threaded so that the shaft assembly can be engaged with both the main piston (15) and the valve body (30) as shown in the non-limiting example of FIG. 4.

Figure 3:
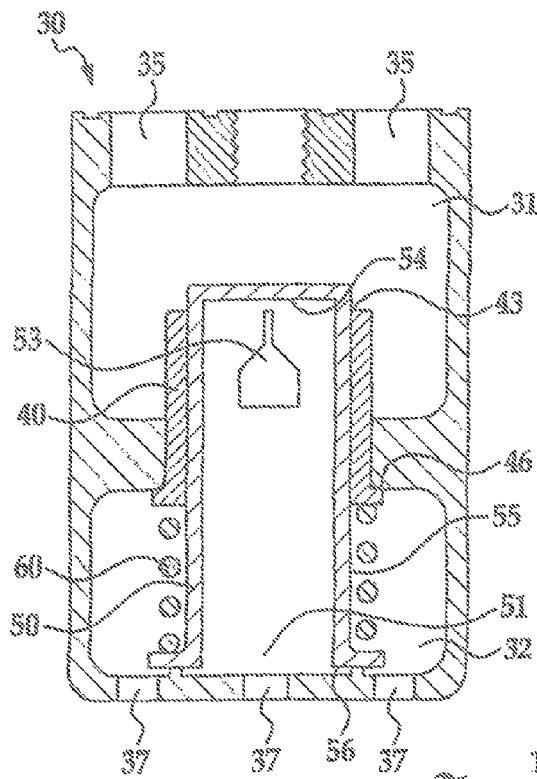
FIG. 3 is a partial sectional view of the of the hydraulic damper spool valve of the present disclosure.

Referring to FIGS. 3 and 4, the valve body (30) is configured with a first chamber (31), a second chamber (32) and a cylindrical passage (33) interconnecting the first chamber (31) and the second chamber (32). A first passage (35) is configured to provide an unobstructed hydraulic path between the damper's upper portion (16) and the first chamber (31). Moreover, a second passage (37) is configured to provide an unobstructed hydraulic path between the damper's lower portion (18) and the second chamber (32). The valve body (30) is additionally configured with stop surfaces (38) (39).

Figure 5:
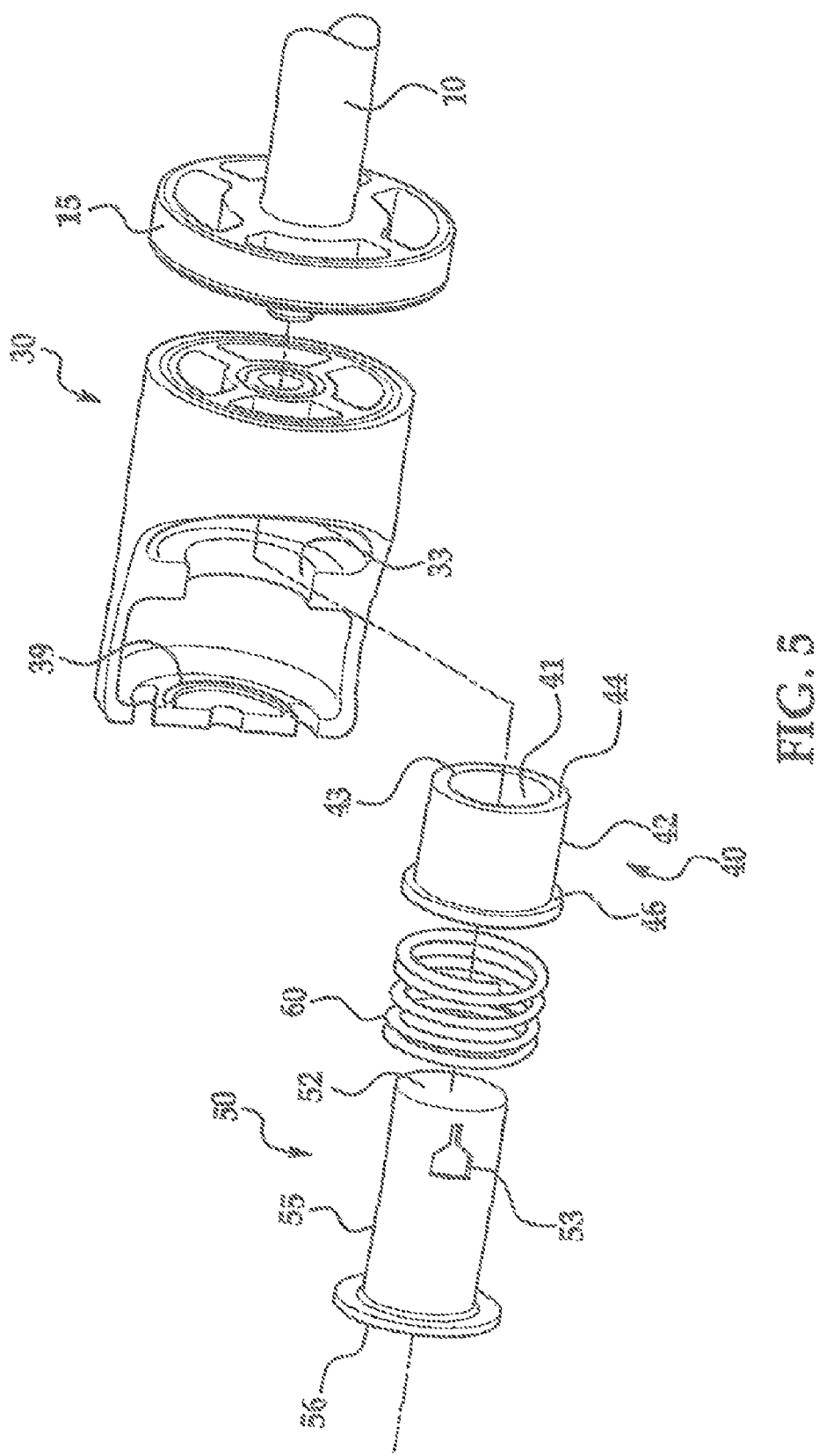
FIG. 5 is an exploded perspective view of the hydraulic damper spool valve of the present disclosure.

Referring to FIGS. 3 and 5, a moveable hollow valve sleeve (40) defines an internal cylindrical bore (41), an external cylindrical surface (42), a sharp edged land feature (43), a first effective piston area (44) and a stop face (46). The cylindrical passage (33) of the valve body (30) is adapted to receive the external cylindrical surface (42) of the valve sleeve (40) with a predetermined, close tolerance radial clearance that is configured to allow longitudinal movement of the valve sleeve (40) within the cylindrical passage (33) while preventing hydraulic flow between the valve sleeve (40) and the cylindrical passage (30). A moveable hollow cylindrical valve spool (50) is configured with a cylindrical wall (55), an open end (51), a closed end (52) that defines a second effective piston area (54), a stop face (56) and a shaped aperture (53) defined in the cylindrical wall (55). The internal cylindrical bore (41) of the valve sleeve (40) is operatively configured to receive the valve spool (50) with a predetermined, close tolerance radial clearance that is configured to allow longitudinal movement of the valve spool (50) within the internal cylindrical bore (41) of the valve sleeve (40) while preventing hydraulic flow through the radial clearance between the valve sleeve (40) and the valve spool (50). A coil spring (60) or similar resilient energy storage means may be arranged between the valve sleeve (40) and the valve spool (50) so as to bias the valve sleeve (40) and spool valve (50) in opposite directions.

When the hydraulic damper assembly (1) is at rest there is no induced pressure differential between the upper portion (16) and the lower portion (18). The coil spring (60) biases the valve sleeve (40) so that the valve sleeve stop face (46) abuts the sleeve stop surface (38) of the valve body (30). The coil spring (60) also biases the valve spool (50) away from the valve sleeve (40) so that the spool stop face (56) abuts the spool stop surface (39) of the valve body (30). When the valve sleeve (40) and the valve spool (50) are biased apart against the stop surfaces (38)(39), the sharp edged land feature (43) is configured so that the valve sleeve (40) completely blocks the shaped aperture (53) of the valve spool (50). When the shaped aperture (53) is completely blocked by the valve sleeve (40), the hydraulic fluid (19) can not move between the first chamber (31) and the second chamber (32). Hence, there is no hydraulic fluid movement between the upper portion (16) and the lower portion (18) when the shaped aperture (53) is completely blocked by the valve sleeve (40).

When the hydraulic damper's main piston (15) moves in a first, rebound direction (100) the operating pressure generated in the hydraulic fluid (19) contained in the hydraulic damper's upper portion (16) acts upon the first effective piston area (44) and induces longitudinal movement of the valve sleeve (40) against the biasing force of the coil spring (60). When the valve sleeve (40) moves longitudinally it causes the sharp edged land feature (43) of valve sleeve (40) to move relative to the stationary valve spool (50) thereby compressing the coil spring (60). Accordingly, the shaped aperture (53) of spool (50) is exposed to the hydraulic fluid in the upper portion (16) via the first chamber (31), and a hydraulic path between the hydraulic damper's upper portion (16) and lower portion (18) is formed.

Varying the induced operating pressure of the hydraulic fluid (19) in the hydraulic damper's upper portion (16) creates a proportional longitudinal movement of the valve sleeve (40) against the biasing force of the coil spring (60) which in turn changes the area of the hydraulic flow restriction by proportionally exposing larger and smaller areas of the shaped aperture (53) as the valve sleeve (40) slides relative to the spool (50). The hydraulic damper's (1) rebound operating characteristics are defined by the proportional opening and closing of the shaped aperture (53) which creates a mathematically predictable and stable pressure vs. flow relationship. This pressure vs. flow relationship of the hydraulic damper (1) can be tuned, when moving in a first direction (100), by altering the rate of the coil spring (60), changing the pre-load on the coil spring (60), modifying the first effective piston area (44) or by altering the profile of the shaped aperture (53).

When the hydraulic damper piston (15) moves in a second, compression direction (101) the operating pressure generated in the hydraulic fluid (19) contained in the hydraulic damper's lower portion (18) acts upon the second effective piston area (54) and induces longitudinal movement of the valve spool (50) against the biasing force of the coil spring (60). When the valve spool (50) moves longitudinally it causes the shaped aperture (53) to move relative to the stationary valve sleeve (40) and sharp edged land feature (43) thereby opening a hydraulic path between the hydraulic damper's lower portion (18) and upper portion (16).

Varying the induced operating pressure in the hydraulic fluid (19) contained in the hydraulic damper's lower portion (16) creates a proportional longitudinal movement of the valve spool (50) against the biasing force of the coil spring (60) which in turn changes the area of the hydraulic flow restriction by uncovering proportionally larger and smaller areas of the shaped aperture (53). In this manner, hydraulic damper's (1) compression operating characteristic is defined by the proportional opening and closing of the shaped aperture (53) which creates a mathematically predictable and stable pressure vs. flow relationship. The pressure vs. flow relationship of the hydraulic damper (1) can be tuned, when moving in a second direction (101), by altering the rate of the coil spring (60), changing the pre-load on the coil spring (60), modifying the second effective piston area (54) or by altering the profile of the shaped aperture (53).

It is to be understood that multiple shaped apertures (53) or an array (not shown) of shaped apertures may be defined in the valve sleeve (40). Regardless of the number of shaped apertures (53), the shaped aperture (53) is configured with a predetermined profile having a variable width which in turn facilitates desired pressure-flow characteristics between the first chamber (31) and the second chamber (32). At any point in the relative movement between the valve spool (50) and valve sleeve (40), the opening of the shaped aperture (53) offers a mathematically predictable hydraulic flow restriction based on established orifice flow theory. For a given coil spring (60) rate and preload, the shaped aperture profile can be configured to produce a wide range of pressure-flow characteristics all of which are predictable using established a wide range of pressure-flow characteristics all of which are predictable using established, closed-form mathematical techniques. The profile of the shaped aperture (53) is not geometrically limited and is generally complex and irregular in shape.

In an alternative embodiment of the present disclosure a separate bypass passage (90) may provide a hydraulic flow path between the valve body's upper portion (16) and lower portion (18). The bypass passage (90) is configured so that the hydraulic fluid (19) can pass between the upper portion (16) and lower portion (18) when the shaped aperture (53) of the valve spool (50) is completely blocked by the valve sleeve (40). The bypass passage (90) is configured with a fixed area orifice that provides a predetermined square law pressure-flow relationship at low levels of main piston (15) movement. In this manner a sharp transition in the pressure-flow characteristic is avoided when the shaped aperture (53) initially opens. The bypass passage can be arranged to be directly through the main piston (15) between the upper side (92) and the lower side (94) of the main piston (15), across the first and second chambers (31)(32) of the valve body (30) or through the closed end (52) of the valve spool (50).

In a further alternative embodiment of the present disclosure, the shaped aperture (53) is not completely blocked when the valve sleeve (40) and valve spool (50) are biased apart from each other and are biased against the stop surfaces (38)(39). In this manner, a small unblocked portion of the shaped aperture (53) provides a predetermined, square law pressure-flow relationship at low levels of main piston (15) movement. It is to be understood that in this position the shaped aperture (53) is partially open when the valve sleeve and the valve spool abut their corresponding stop surfaces—sleeve stop surface (38) and spool stop surface (39). In this manner, a sharp transition in the pressure-flow characteristic is avoided when relative longitudinal movement of the valve spool (50) and valve sleeve (40) initially occurs.

Figure 6:
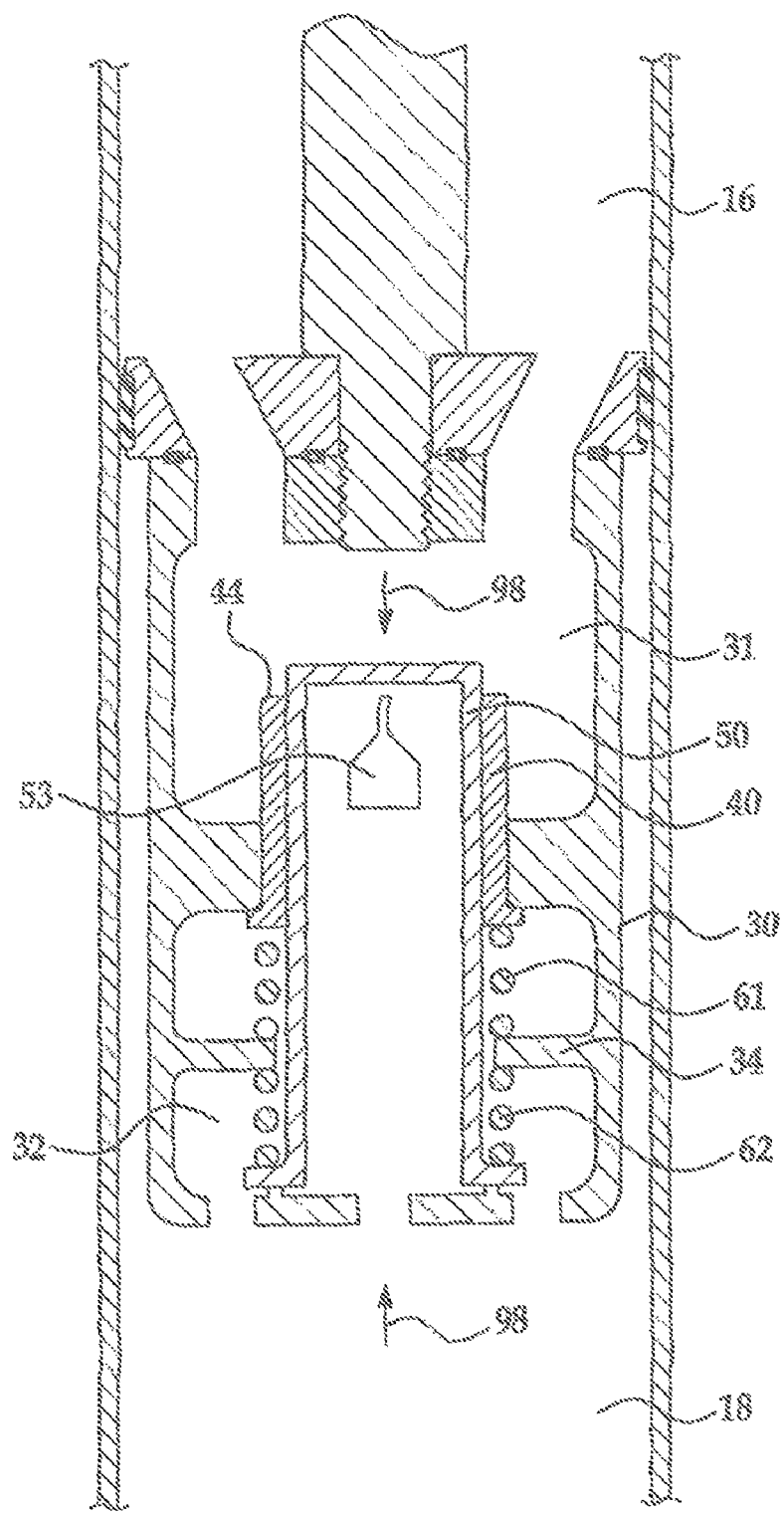
FIG. 6 is a partial, enlarged, cross-sectional view of another embodiment of the hydraulic damper spool valve of the present disclosure.

FIG. 6 illustrates an alternative embodiment of the present disclosure in which two coil springs (61)(62) or similar resilient energy storage member or means are arranged to independently bias the valve sleeve (40) and valve spool (50) in opposing directions to a force vector (98) generated by the operating pressures in the dampers (1) hydraulic fluid (19). The valve body (30) is configured with a spring seat (34) that is adapted to carry the fixed ends of the two coils springs (61)(62). Varying the induced operating pressure in the hydraulic fluid (19) contained in the hydraulic damper's upper portion (16) (and first chamber (31)) creates a proportional longitudinal movement of the valve sleeve (40) against the biasing force of the coil spring (61) which in turn changes the area of the hydraulic flow restriction by uncovering proportionally larger and smaller amounts of the shaped aperture (53). Varying the induced operating pressure in the hydraulic fluid (19) contained in the hydraulic damper's lower portion (18) (and second chamber (32)) creates a proportional longitudinal movement of the valve spool (50) against the biasing force of the coil spring (62) which in turn changes the area of the hydraulic flow restriction by uncovering proportionally larger and smaller amounts of the shaped aperture (53). In this manner, the pressure vs. flow relationship of the hydraulic damper (1) can be independently tuned in its rebound direction (100) by altering the rate or preload of the first coil spring (61) and independently tuned in its compression direction (101) by altering the rate or preload of the second coil spring (62). This arrangement offers higher levels of operating characteristic asymmetry than when using a single coil spring or resilient energy storage means.

A further alternative embodiment of the present disclosure is shown in FIG. 7 in which the valve body (30) is mounted within the main body (5) of the hydraulic damper assembly (1). The main body (5) is provided with flow passages (6) that provide an unobstructed hydraulic path between the damper's upper portion (16) and the first chamber (31) and a second passage (37) is configured to provide an unobstructed hydraulic path between the damper's lower portion (18) and the second chamber (32). In this manner, the valve body (30) is stationary but the shaped aperture (53) is configured to provide a single path for the hydraulic fluid (19) between the upper portion (16) and lower portion (18) of main body (5) of the damper and is adapted to be progressively opened and closed in response to the pressure differential across the main piston (15).

What is claimed is:

1. A hydraulic damper spool valve for a hydraulic damper, comprising:
   a valve sleeve providing an internal cylindrical bore, and an external cylindrical surface, a sharp edged land feature, and a first effective piston area;
   a cylindrical valve spool having an open end, a closed end defining a second effective piston area, and a shaped aperture defined in a wall of the valve spool;
   the valve sleeve being adapted to accept the valve spool with a predetermined, close tolerance radial clearance that is configured to allow longitudinal movement of the valve spool within the internal cylindrical bore of the valve sleeve while preventing hydraulic flow through the radial clearance;
   a valve body having a first chamber and a second chamber interconnected via a cylindrical passage, the cylindrical passage being adapted to accept the valve sleeve with a predetermined, close tolerance radial clearance that is configured to allow longitudinal movement of the valve sleeve within the cylindrical passage while preventing hydraulic flow through the radial clearance;
   the valve body affixed to the damper's main piston, the valve body defining a first passage that provides an unobstructed hydraulic path
   between an upper portion of the hydraulic damper and the first chamber and a second passage that provides an unobstructed hydraulic path between a lower portion of the hydraulic damper and the second chamber;
   a resilient energy storage member arranged between the valve sleeve and valve spool so as to bias the valve sleeve and valve spool in an opposing direction to a force vector generated by the operating pressures in the damper's hydraulic fluid;
   whereby the main piston is configured to move in a first direction and the operating pressure generated in the damper's hydraulic fluid acts upon the first effective piston area and induces longitudinal movement of the valve sleeve against a biasing force of the resilient energy storage member causing the sharp edged land feature to move relative to the shaped aperture thereby varying fluid flow through the varying exposed, open shaped aperture, and when the hydraulic damper's main piston moves in a second direction the operating pressure generated in the damper's hydraulic fluid acts upon the second effective piston area and induces longitudinal movement of the valve spool against a biasing force of the resilient energy storage member causing the shaped aperture to move relative to the sharp edged land feature varying the fluid flow through the varying exposed, open area of the aperture.

2. The hydraulic damper spool valve as defined in claim 1 wherein the valve sleeve further comprises a sleeve stop face operatively configured to abut a matching sleeve stop surface arranged on the valve body.

3. The hydraulic damper spool valve as defined in claim 2 wherein the valve spool further comprises a valve stop face operatively configured to abut a matching valve stop surface arranged on the valve body.

4. The hydraulic damper spool valve as defined in claim 3 wherein the resilient energy storage member is adapted to bias the valve sleeve and the valve spool in opposing directions so that the valve and sleeve stop faces abut the corresponding valve and sleeve stop surfaces on the valve body.

5. The hydraulic damper spool valve as defined in claim 4 wherein the shaped aperture is completely blocked by the valve sleeve when the valve sleeve and the valve spool stop faces abut the stop surfaces on the valve body.

6. The hydraulic damper spool valve as defined in claim 1 wherein the resilient energy storage member is a coil spring.

7. The hydraulic damper spool valve as defined in claim 1 wherein the shaped aperture is operatively configured to provides a variable aperture that facilitates a desired pressure-flow characteristic.

8. The hydraulic damper spool valve as defined in claim 1 wherein an array of shaped apertures are defined in the wall of the valve spool.

9. The hydraulic damper spool valve as defined in claim 1 wherein a bypass passage is provided between the upper side of the damper's main piston and the lower side of the damper's main piston so as to provide a hydraulic flow path that acts in parallel with the shaped aperture.

10. The hydraulic damper spool valve as defined in claim 1 wherein the shaped aperture is partially open when the valve sleeve and the valve spool stop faces abut the stop surfaces on the valve body.

11. The hydraulic damper spool valve as defined in claim 10 wherein the resilient energy storage member is a coil spring.

12. The hydraulic damper spool valve as defined in claim 1 wherein two resilient energy storage members are arranged to independently bias the valve sleeve and valve spool in opposing directions to a force vector generated by the operating pressures in the damper's hydraulic fluid.

13. The hydraulic damper spool valve as defined in claim 12 wherein the two resilient energy storage members are configured to be located coaxially with the valve spool and valve sleeve.

14. The hydraulic damper spool valve as defined in claim 1 wherein the resilient energy storage member is configured to be located coaxially with the valve spool and valve sleeve.

15. The hydraulic damper spool valve as defined in claim 1 wherein the valve body is adapted to be mounted within the main body of the hydraulic damper.

* * * * *